United States Patent Office 2,952,254
Patented Sept. 13, 1960

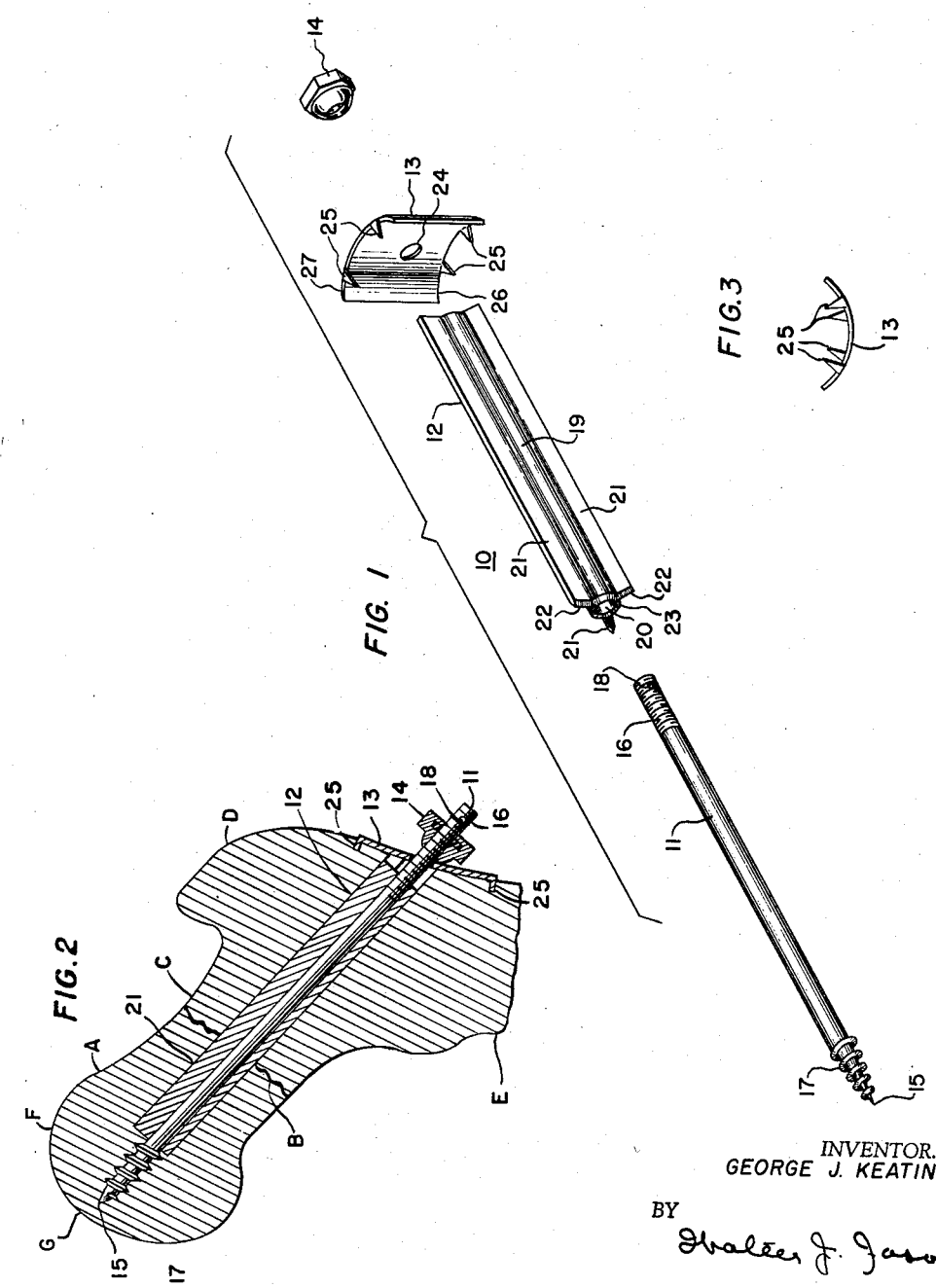

2,952,254
FASTENER
George J. Keating, 10865 Calavo Drive, La Mesa, Calif.
Filed Nov. 6, 1958, Ser. No. 772,243
5 Claims. (Cl. 128—92)

This invention relates generally to fasteners and more particularly to nail devices used in the treatment of bone fractures.

An object of the present invention is to provide a novel form of nailing assembly having a construction which adapts it for use in treating hip fractures by securing broken bone portions together in effectively fixed relationship.

Another object of this invention is to provide an improved nail assembly for holding broken bone portions together which acts in a manner to achieve compression at the opposing fracture surfaces.

Another object resides in providing an improved form of hip nail assembly for treating a femoral neck fracture wherein the cooperating elements of the nail assembly serve to effect opposing compression forces directly across the fracture site.

Another object is to provide a hip nail assembly which is simple in construction, which can be readily placed in operative position, and which is efficient in action.

Other objects and features of the present invention will be readily apparent to those skilled in the art from the following specification and appended drawing wherein is illustrated a preferred form of the invention and in which:

Figure 1 is an exploded view of a nail assembly having a construction in accordance with this invention.

Figure 2 is a sectional view showing the present nail assembly in operative position in treating a femoral neck fracture; and Figure 3 is a side elevational view of a detail.

Referring now with particularity to the drawings the nail assembly of the present invention is indicated therein in its entirety by the numeral 10.

Nail assembly 10, as shown, embodies a central pin or stem portion 11, a sleeve or jacket member 12, an anchor plate 13 and a usual dome-shape, self-locking nut 14.

Central pin 11 is of cylindrical form for the major portion of its length and tapers to a conical point 15 at its lower end. A threaded portion 16 is provided at its other end for accommodation of the nut 14. Extending helically from the lower cylindrical end of the pin 11 and substantially the entire length of conical portion 15 is an external lag-screw thread 17, which is formed integrally with pin 11. A transverse through opening 18 is provided at the upper end of pin 11 for accommodating a suitable tool to rotate and screw pin 11 into place.

The sleeve or jacket member 12 embodies an elongated generally cylindrical body portion 19 having an axial bore 20 of a diameter sufficient to permit the passage of pin 11 therethrough. In equi-spaced relationship about the circumference of body portion 19 are three longitudinally extending flanges 21. Flanges 21, preferably, are formed integral with body portion 19 and are of the same length thereas. Flanges 21, as shown, are of substantially rectangular configuration and have their lower lateral edges shaped into the form of chisel edges as at 22. Lower annular rim 23 of body portion 19 which is adjacent chisel edges 22 is also shaped to provide a cutting or chisel edge.

Anchor plate 13 is a generally rectangular metal piece which has been bent into a contour adapting it to rest firmly upon the femur when in place and includes a central aperture 24 for accommodating the pin 11. Plate 13 also includes a plurality of integral pointed attaching prongs 25 which depend from the body of the plate. In the embodiment illustrated the prongs are four in number with a pair being disposed on opposite lateral edges 26 and 27 of the plate. As shown, the pair of prongs 25 on lateral edge 26 are spaced somewhat closer together than the pair on lateral edge 27. This staggering of the prongs serves to lessen the possibility of longitudinal cracks being formed in the bone.

The pin 11, jacket 12 and anchor plate 13 may be made of any suitable hard metal. It is preferred, of course, that the metal used be one which has little tissue reaction. However, the invention is not to be restricted to any one form or type of metal since satisfactory metals are commercially available and since a particular metallic composition does not form a part of this invention. For instance, chromium-nickel stainless steels may be employed in the present invention, an example being 18—85 MO stainless steel.

In Figure 2 there is illustrated the upper portion of a femur A to which the present invention has been applied for treatment of a fracture thereof indicated at B. Fracture B, as shown, extends across femoral neck C of the femur.

In the treatment of a fracture, the pin 11 of the nail assembly 10 is inserted first. However, prior to placement of the pin 11 a guide hole is formed to assist in its proper placement. To this end a suitable tool, such as a drill, is employed to form an angularly disposed guide hole which starts at a point suitably spaced below the greater trochanter D of the lateral aspect of femoral shaft E, slants upwardly through femoral shaft E, then up through the central portion of femoral neck C, across the site of the fracture B, and into femoral head F. Check X-rays are taken at appropriate times to assure that the guide hole is properly located. After the proper guide hole has been drilled then pin 11 is screwed into place following the path of the guide hole. When pin 11 is in final position its lag-screw end will be positioned closely adjacent, such as a distance of ¼" to ⅜", the articular surface of the central portion G of the femoral head F. Pin 11 is selected in an appropriate length that the threaded portion 16 thereof will project outwardly of the femoral shaft E.

After pin 11 is in place that end of jacket 12 which carries the chisel edges 22 and 23 is fitted upon the threaded portion 16 which projects from femoral shaft E. Thereafter, the jacket 12 is driven, by a suitable tool, into the femur slidably along the pin 11 until the chisel edges 22 and 23 abut the inner base of the lag-screw thread 17 on pin 11. When in final position, jacket 12 will be entirely contained within the femur, with its inner end in engagement with lag-screw 17 at femoral head F, and its outer end spaced inward a slight distance from the exterior surface of femoral shaft E.

After jacket 12 has been inserted anchor plate 13 is slipped over the threaded portion 16 of pin 11 and force applied thereto to press its attaching prongs 25 into the bone of the femoral shaft E and affix plate 13 firmly against the lateral aspect of the femoral shaft E. Nut 14 is then threaded onto portion 16 and into bearing engagement with washer 13. Nut 14 is of the locking type having a conventional internal rubber or fiber insert which closely engages the threads 16. Since commercially available lock nuts are contemplated for use herein a further description is not necessary.

It is understood, of course, that pin 11 and jacket 12 will be selected in diameters and lengths which will accommodate the anatomical size of the femur of the individual patient. With the use of X-rays it can be readily determined the size of the bone to be penetrated, what the angle of penetration should be and how much bone will be required to be spanned, and thereafter a pin 11 and a jacket 12 of appropriate diameters and lengths can be selected for use. The length of pin 11 will be greater than that of jacket 12 by an amount sufficient to carry a run of lag-screw thread which will permit firm implanting of the head of pin 11. A difference of approximately an inch of length will effect a useful device.

In its operation, the present nail assembly effects compression forces acting directly across the fracture site B. With the lag-screw 17 of pin 11 firmly implanted in the femoral head F and with the anchor plate 13 firmly attached to the exterior surface of the femoral shaft E two fixed points are established for effecting internal fixation of the fractured femoral neck C. It is apparent that with the tightening of the dome portion of nut 14 into bearing engagement with anchor plate 13 that a pulling force is applied to pin 11 to produce compression of the fracture fragments.

It is noted that central opening 24 of plate 13 is somewhat larger than the diameter of pin 11 to readily accommodate the angular disposition of the pin 11 with respect to plate 13. Since pin 11 passes through the central opening 24 of anchor plate 13 any tendency of the pin 11 to drift sideways is closely limited by the defining edges of the slightly enlarged opening 24. Jacket 12 assists pin 11 in maintaining the fracture fragments in desired healing relationship since its flanges act to prevent rotational movement of the bone fragments across the fracture site.

With the use of the present nail assembly 10 any possibility of angular, rotational or torsional forces acting adversely at the fracture site is virtually completely obviated. The fracture fragments are locked together and the cellular apposition would be a fixed and mechanically stable apposition.

It is known that compression of bone across a fracture site definitely enhances and speeds up the process of bone healing and the present nail assembly 10 effectively and efficiently acts to provide desirable compression forces directly across and through the fracture site.

With hip motion and hip function nail migration often occurs when the usual form of nail is employed in the treatment of fractures to complicate the process of healing. By providing solid fixation in both the distal and proximal fracture fragments and having a locking force across the fracture site, the present nail assembly 10 virtually eliminates any possibility of nail migration, either sideways or longitudinally, to definitely enhance healing and avoid secondary complications.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. A fastening device for treating bone fractures comprising an elongated pin having a cylindrical body with a conically formed end portion, a thread on said conically formed end portion, said cylindrical body having a threaded portion at its opposite end, an elongated sleeve member having a central bore therethrough accommodating said elongated pin between the ends thereof, said sleeve member having laterally projecting restraining flange means thereon, an anchor plate fitting on said cylindrical body at said opposite end, and a holding member threadably carried by said threaded portion of said opposite end for bearing engagement with said anchor plate.

2. A fastening device for treating bone fractures comprising an elongated pin having a cylindrical body tapering to a conical point at one end, an external helical thread on said tapered end, an elongated sleeve member having a bore therethrough, said cylindrical body being received within said bore with the tapered end thereof and the end opposite projecting beyond opposite ends of said sleeve member, said sleeve member having a plurality of longitudinally extending, laterally projecting restraining flange means, and force applying means mounted on said opposite end of said cylindrical body.

3. A fastening device for treating bone fractures comprising an elongated pin having a cylindrical body with a conically formed end portion, an external helical thread on said end portion, an elongated sleeve member, said sleeve member having a generally cylindrical body portion with an axial bore therethrough accommodating said elongated pin, said elongated sleeve being of shorter length than said pin for projection of the opposite ends of said pin beyond the opposite ends of said sleeve, said body portion of said sleeve having about the circumference thereof a plurality of equi-spaced, longitudinally extending lateral projecting restraining flanges, and force applying means mounted on the end of said cylindrical body opposite to said conically formed end portion.

4. A fastening device for treating hip bone fractures comprising an elongated pin having a cylindrical body with a conically formed end portion having an external thread thereon, an elongated sleeve member, said sleeve member having a generally cylindrical body portion with an axial bore therethrough accommodating said elongated pin, said elongated sleeve being of shorter length than said pin for projection of the opposite ends of said pin beyond the opposite ends of said sleeve, a plurality of equi-spaced, longitudinally extending, laterally projecting restraining flanges formed about the circumference of said body portion, said flanges having chisel edges at one of their ends, and force applying means mounted on the end of said cylindrical body opposite to said conically formed end portion.

5. A fastening device for treating hip bone fractures comprising an elongated pin having a cylindrical body with a conically formed end portion, a lag-screw thread on said conically formed end portion, an elongated sleeve member, said sleeve member having a generally cylindrical body portion with an axial bore therethrough accommodating said elongated body, said elongated sleeve being of shorter length than said pin for projection of the opposite ends of said sleeve, a plurality of equi-spaced, longitudinally co-extensive, laterally projecting restraining flanges formed about the circumference of said body portion, the annular rim of said generally cylindrical body portion of said sleeve disposed adjacent the lag-screw of said pin being in the form of a chisel edge, the ends of said flanges lying adjacent said annular rim also being in the form of chisel edges, a portion at the end of said cylindrical body of said pin opposite the conically formed end portion thereof being threaded, an anchor plate fitting on pin at said opposite threaded end portion, said plate having a plurality of prongs projecting therefrom, and a dome nut threadably carried by said opposite threaded end portion for bearing engagement with said anchor plate.

References Cited in the file of this patent

UNITED STATES PATENTS

| 2,267,925 | Johnston | Dec. 30, 1941 |
| 2,702,543 | Pugh et al. | Feb. 22, 1955 |
| 2,801,631 | Charnley | Aug. 6, 1957 |

FOREIGN PATENTS

| 918,531 | Germany | Sept. 30, 1954 |
| 1,136,123 | France | Dec. 22, 1956 |